US006587738B1

(12) United States Patent
Belcea

(10) Patent No.: US 6,587,738 B1
(45) Date of Patent: Jul. 1, 2003

(54) OPTIMAL LOCOMOTIVE ASSIGNMENT FOR A RAILROAD NETWORK

(75) Inventor: John M. Belcea, West Melbourne, FL (US)

(73) Assignee: GE-Harris Railway Electronics, L.L.C., Melbourne, FL (US)

(*) Notice: Subject to any disclaimer, the term of this patent is extended or adjusted under 35 U.S.C. 154(b) by 0 days.

(21) Appl. No.: 09/520,598

(22) Filed: Mar. 8, 2000

Related U.S. Application Data

(60) Provisional application No. 60/173,696, filed on Dec. 30, 1999.

(51) Int. Cl.[7] .......................... G06F 17/60; G08G 1/123
(52) U.S. Cl. ............................ 700/33; 700/34; 700/36; 701/117
(58) Field of Search ..................... 700/29–36, 97, 700/99, 103; 701/19, 20, 117; 246/2 R, 3, 4

(56) References Cited

U.S. PATENT DOCUMENTS

| 5,177,684 | A | | 1/1993 | Harker et al. ............... 364/436 |
| 5,623,413 | A | * | 4/1997 | Matheson et al. ........... 364/436 |
| 5,828,079 | A | * | 10/1998 | Polivka et al. .............. 701/117 |
| 5,836,529 | A | | 11/1998 | Gibbs ........................ 246/122 R |
| 6,154,735 | A | * | 11/2000 | Crone .......................... 706/45 |
| 6,263,265 | B1 | * | 7/2001 | Fera ............................ 701/19 |
| 6,377,877 | B1 | * | 4/2002 | Doner .......................... 701/19 |

FOREIGN PATENT DOCUMENTS

DE    195 40 834 A1    10/1995

OTHER PUBLICATIONS

K. Ziarati, F. Soumis, J. Desrosiers, S. Gelinas, A. Saintonge; Locomotive assignment with heterogeneous consists at CN North America; European Journal of Operational Research 97 (1997) 281–292.

* cited by examiner

Primary Examiner—Paul P. Gordon
(74) Attorney, Agent, or Firm—Carl A. Rowold; John L. DeAngelis, Jr.; Beusse Brownlee Bowdoin & Wolter, P.A.

(57) ABSTRACT

A computer-implemented method for optimizing locomotive assignments on a railroad network. The locomotives are assigned to power and signaling classes, based on equipment installed within each locomotive. An objective function is set forth that considers the cost of moving extra power in the network, the penalties incurred for late train departures due to the failure to assign an appropriately-equipped locomotive and the cost of train operation. Various constraints are set forth that must be taken into consideration when optimizing the objective function.

48 Claims, 2 Drawing Sheets

OPTIMAL LOCOMOTIVE ASSIGNMENT FOR A RAILROAD NETWORK

This application claims the benefit of U.S. Provisional Application No. 60/173,696 filed Dec. 30, 1999.

FIELD OF THE INVENTION

This invention relates to a method for determining the optimal assignment (distribution) of locomotives on a railroad network, by taking into account various costs and penalty factors associated with the movement and distribution of the locomotives.

BACKGROUND OF THE INVENTION

One problem faced by railroad operators is the assignment of a sufficient number of locomotives of different types to operate on a pre-planned schedule. For efficient and timely operation of a railroad, it is essential that the tractive power (i.e., locomotives) is distributed around the network as required to move people and freight. The required distribution is also dynamic with respect to time and constantly changing due to track outages, planned or emergency locomotive maintenance, weather conditions, etc.

The problem of locomotive assignment can be illustrated by the following simple example. A railroad moves grain from Nebraska to a port on the Gulf of Mexico. To move the grain south requires a certain amount of tractive effort provided by the railroad locomotives. However, moving the empty cars north back to Nebraska, requires far less locomotive power because the cars are empty. The result is an accumulation of tractive power at the Gulf of Mexico port. To minimize its costs, the railroad desires to move the locomotives back north to Nebraska in a cost efficient manner. For example, the locomotives could be put into service moving freight on a different route such that they eventually find their way back to Nebraska, where they can again be put into service hauling grain south.

Each railroad has at least one locomotive dispatcher with the responsibility of ensuring that each terminal has the correct number of locomotives to move the freight on schedule. The locomotives must be in the yard and ready to depart on time. To carry out this function, the dispatcher must assess the location, movement, and availability of each locomotive and then predict when and where it will be available for the next train consist. For example, the dispatcher may be operating 16 hours ahead in planning the movement and availability of locomotives.

The cost of moving a locomotive either with a train as active power, with a train in-tow, or by itself must be considered by the dispatcher. A penalty may be incurred by the railroad, under its contract with a customer if a train is not ready to depart on time because there is not sufficient tractive power to move it or if the train arrives late at its destination. The penalty applied to a late arriving train is actually a sum of penalties associated with each individual car. The penalty incurred for each car depends on the shipping commitment pertinent to that car. The penalty could be zero for cars that have arrived ahead of schedule and could be very large for cars that are significantly behind schedule. In some situations, it may actually be cheaper for the railroad to pay the late penalty than to incur the cost of moving a locomotive to meet the schedule.

The dispatcher must also give consideration to various circumstances that may interrupt the smooth flow of freight on the railroad network. The dispatcher cannot exceed the locomotive capacity of each yard, and the traffic on each railroad corridor must be established to ensure that at any given time there are not an excess number of trains travelling the corridor, which would slow down the operation of all trains on the corridor. Locomotives must undergo various levels of inspections at predetermined intervals. Simple inspections are performed in the yard, while more thorough inspections must be performed in an inspection shop. The timing and duration of these inspections must be accounted for in determining the optimum distribution of locomotives in the network. Further, the productivity of each inspection shop will determine the length of time the locomotive is out of service.

Locomotives are segregated into power classes, with each power class having a different power/speed relationship, that is for a given speed the locomotive can generate a given amount of tractive power. The tractive force capacity influences the train consists to which the locomotive can be assigned. Obviously, heavier trains require the use of locomotives capable of pulling heavier loads. Assignment of locomotives must also be accomplished with consideration to track rail and load bearing capacities. Locomotives that are too heavy can damage the rail or the roadbed.

Railroad dispatchers communicate with the locomotive engineers by sending signals through the rails and through over-the-air communications links. There are two popular signaling systems referred to as Centralized Train Control (CTC) and Automated Block Signaling (ABS). For both the CTC and ABS signaling systems the track is divided into sections or segments, with each segment having a detection circuit. When a train enters a section, it closes the electrical circuit and sensors identify that a train occupies the section. Centralized Train Control comprises a system of computers that read the track sensor status and transmit data regarding train positions to a central dispatcher. The central dispatcher (either a computer or a human operator using a computer) schedules and controls train movements by setting the color of each individual traffic signal based on train position and specific railroad operational rules. In a centralized train control system, all signals in an area are controlled from one central point. In the ABS system, traffic signals colors are controlled by the train on the track. The color of the traffic signal at the beginning of the occupied segment is red, the color of the traffic signal on the previous segment is yellow, and the color of the signal on the next previous segment is green. Thus, the color of the signal is determined from the status of a single track segment.

In places along the railroad track where there is reduced visibility (narrow curves, steep slopes, etc.) secondary signals are installed. The secondary signals "repeat" or "predict" the color of the next primary signal using combinations of colors and light positions. In the ABS system, a secondary signal is always subservient to its main signal, while in the CTC system each signal is independently controlled and, therefore, can change its aspect. Both the ABS and CTC systems send signals identifying the status of the next primary signal through the rails to the locomotive. Special equipment installed in the locomotive cab receives the signals to advise the engineer of the color of the next traffic signal before it becomes visible. Unfortunately, the systems use a different code of electrical signals for transmitting the signaling information.

Some locomotives are equipped to respond only to CTC signaling, others only to ABS signaling, and some locomotives to both. Occasionally, a locomotive may have no on-board signaling capability. Because the signaling system advises the engineer as to the conditions of the rail, occupancy of subsequent rail blocks along the path of travel, etc., the lead locomotive must have a signaling system capable of interfacing with the signaling system of the track over which it travels.

As can be seen, the scheduling and dispatching of locomotives is an extremely complex problem that can cause significant inefficiencies and extra costs to the railroad. In many situations, there simply is no solution to an under capacity problem other than running the locomotive, by itself, to the place where it is needed. This is an obvious cost to the railroad in terms of personnel, fuel, and wear and tear on the locomotive. Then there is the additional problem of finding a time slot in the corridor schedule so that the locomotive can travel to the terminal where it will later be needed.

SUMMARY OF THE INVENTION

In accordance with the present invention, the above described shortcomings of the locomotive dispatching process are obviated by a new and improved dispatching algorithm. The process utilizes a mathematical model of the locomotive assignment problem that assigns the locomotives in the network to various terminals at minimum cost and at the appropriate time. The present invention minimizes the costs of moving locomotives to achieve the desired distribution at the appropriate time and minimizes the penalties for delaying train departures. The present invention creates a plan for the distribution of all locomotives owned or controlled by a railroad with regard to power class and the cab signaling capabilities of each locomotive. The process can be executed using a sliding time window of any duration from the current moment to the future.

The present invention plans the movement of locomotives across the railroad network as either an active locomotive or as extra power connected to another train consist (i.e., in tow), and accomplishes optimal dispatching by considering the various parameters influencing the use and movement of locomotives across the network. These parameters include the power class and signaling capabilities of each locomotive. The process takes into account the number of locomotives needed at various points in the network and various costs associated with moving or holding the locomotives so that they are available when needed.

BRIEF DESCRIPTION OF THE DRAWINGS

The present invention can be more easily understood, and the further advantages and uses thereof more readily apparent, when considered in view of the description of the preferred embodiments and the following figures in which.

DETAILED DESCRIPTION OF THE PREFERRED EMBODIMENTS

Figure 1:
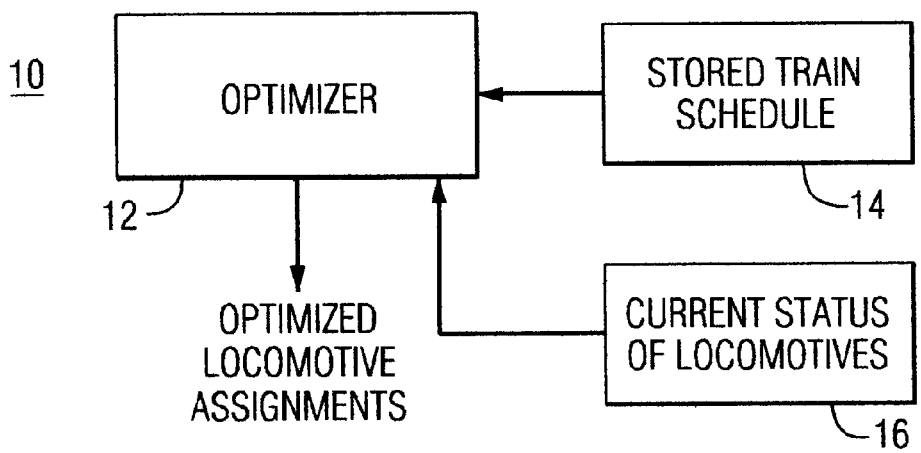
FIG. 1 is a block diagram of a locomotive movement planner including the schedule optimizer of the present invention.

Before describing in detail the particular locomotive assignment process in accordance with the present invention, it should be observed that the present invention resides primarily in a novel combination of processing steps. Accordingly, these processing steps have been represented by conventional processes in the drawings showing only those specific details that are pertinent to the present invention, so as not to obscure the disclosure with structural details that will be readily apparent to those skilled in the art having the benefit of the description herein.

The present invention is a process for optimizing the assignment of locomotives in a railroad network. The process performs the planning of locomotive assignments across a selected area, and minimizes the cost of locomotive distribution, the penalties paid for delaying train departures and the cost of performing the operation of moving locomotives to the point where they are needed at the appropriate time. The present invention creates a plan for the distribution of all locomotives owned, leased or controlled by the railroad, with regard to the power class and cab-signaling capabilities of each locomotive. The process can be executed using a sliding time window of any size, from the current moment to several days (or longer) into the future. The process plans the movement of locomotives across the network as active power (providing tractive power to a consist) or as extra power (in tow coupled to another locomotive).

Definitions and Notations

All known mathematical values are printed in upper case, while unknown variables are in lower case. Sets are printed in upper case bold character (for example, Y).

Each locomotive operating on the railroad network has two descriptors. The first descriptor represents the locomotive power class (C36-7, SD45-T2, C44AC, etc.). Since the power class is a part of the technical specifications of the locomotive, it cannot change. In the present invention locomotives are defined by their power group, which accounts for the limited compatibility that exists between certain power classes. Locomotives in the same power group can be coupled together. The process includes a matrix defining the compatible classes of power.

The second descriptor defines the cab signaling system installed on the locomotive. There are two cab signaling systems in use on North American railroads today. These are the Centralized Train Control and the Absolute Block Signaling. As discussed above, some locomotives are equipped with only the CTC system and others are equipped with only the ABS system. Other locomotives may not have a signaling system capability, while still others may have both the ABS and CTC systems installed.

The cab-signaling category changes if the cab equipment is replaced. Note that the cab-signaling category is important only for the lead locomotive (typically, a first locomotive at the front of the train), from where the engineer drives the train. Any locomotive that cannot be utilized as a lead locomotive, for example because it is not winterized during the cold season, has cracked windows, or has faulty non-vital control equipment, is assigned a signaling category "none" to account for its inability to serve as the lead locomotive.

The square matrix $S_s^{so}$ provides the mapping between the signaling equipment installed in the locomotive cab and the signaling equipment installed on the corridor over which the locomotive is traveling. The upper index refers to the signalling system installed on the track, and the lower index refers to the cab-installed signalling equipment. The values on the main diagonal of the matrix are equal to one, indicating that the cab signaling equipment is identical to the track installed equipment. The exception is the line and the column associated with "none" or no signaling equipment installed, where the entries are zero.

The matrix values for track-installed signaling systems that are a subset of the locomotive-installed equipment are also set to one. For example, the compatibility between a locomotive having both CTC and ABS equipment and the track signaling system CTC is $S_{CTC+ABS}^{CTC}=1$. The value of one shows the fact that locomotives equipped with CTC and ABS signaling can be used as lead locomotive for trips requiring CTC signaling only. Needless to say, $S_{CTC+ABS}^{ABS}=1$ too. Obviously, $S_{CTC}^{CTC+ABS}=0$ since locomotives with only CTC installed system cannot cover track corridors with CTC on one section and ABS on the other section.

The present invention includes some needed redundancy. Some parameters refer to a train t originating at location i. The redundancy comes from the fact that a train can originate at only one location, and, once the train is identified, the originating location becomes unambiguous. But, two indices are used to describe the train because some operations in the process require summation over either one of the two indices.

The term "power change location" as used herein, designates a track length that is small enough to ignore the time and cost for moving locomotives along it. Such a section of track could be as small as a yard or a terminal, but can also be much larger, as will be shown below. The process performs the planning for moving power between such locations, but establishing the extent of each track length is a matter of implementation and may depend of many factors that are specific to each situation. Keeping the number of such "power change locations" as small as possible reduces the amount of data on which the process must operate and thus will decrease its run time.

Table 1 below presents six categories of entities: indices and parameters, sets, unknown, static, dynamic and auxiliary entities, which are used in the process of the present invention. Indices and parameters are used for qualifying entities used in the system of constraints. All entities qualified by indices and parameters are organized in sets: sets of locomotive, sets of trains moving between two locations, etc. The static entities are not time dependent and are not modified during the optimization process performed by the present invention. The value or values of the static entities are well known before the optimization starts. For example, the amount of power generated by a locomotive is independent of the optimization process. The penalty paid per time unit for not powering a train is known before the optimization process starts, although it may have different values from one time period to another. For example, it may be zero for the first few hours, when all of the cars will be able to make their connection to next train; after that the penalty may jump as a block of cars miss the next connection, jeopardizing on time delivery.

Values of dynamic entities are known at the beginning of the optimization process, but for the reminder of the time window of interest they depend on values of certain unknown variables that are associated with previous stages of the process. For example, the number of locomotives at one particular location is a known entity when the optimization starts. The optimization process programs the movement of locomotives across the network, which makes the entity, "number of locomotives at the given location" dependent of elements whose values are found while optimizing algorithm runs.

Auxiliary entities are used only for making the presentation easier to understand.

TABLE 1

| Symbol | Meaning | Comments |
|---|---|---|
| Indices and parameters | | |
| c | Indices for differentiating the class of power. | |
| g | Indices for marking the locomotive group of power. | |
| i, j | Indices indicating one location or two adjacent locations (with direct connection). | |
| s | Indices indicating the locomotive cab signaling category. | |
| τ | The time parameter. | Integer values. |
| Sets | | |
| C | The set of classes of power. | |
| G | The set of groups of power. | |
| K | The set of corridors in network. | |
| $N_i$ | The set of locations adjacent to location i. | |
| S | The set of signaling categories. | |
| $T_{i,j}$ | The set of trains at location i planned to move to location j. | |
| Y | The set of locations in network. | |
| Unknown entities | | |
| $a_{i,t}^{s,c}(\tau)$ | The number of locomotives of power class c cab signaling type s assigned to train t initiated at location i during the time interval (τ, τ + 1). | Integer values only. |
| $\alpha_{i,t}^{g}(\tau)$ | Indicator for marking that train t at location i is powered with locomotives from power group g. | Integer values only. From the system of constraints will result that it can be 1 for no more than one power group. |
| $p_i^{s,c}(\tau)$ | Number of locomotives of signaling category s power class c that are on hand to be assigned to trains in location i during the time interval (τ, τ + 1). | Integer values only. |

TABLE 1-continued

| Symbol | Meaning | Comments |
|---|---|---|
| $\rho_i^{s,c}(\tau)$ | Number of locomotives of signaling category s power class c that arrive as active power at location i during the time interval $(\tau, \tau + 1)$. | |
| $w_{i,t}^{s0,c}(\tau)$ | Confirms the utilization of crew planned for train t originating at location i during the time interval $(\tau, \tau + 1)$. | Values of zero or one only. |
| $x_{i,j}^{s,c}(\tau)$ | Number of locomotives of signaling category s, power class c, planned to exit location i and directed to adjacent location j as extra power during the time interval $(\tau, \tau + 1)$. | This entity does not include the active power that actually pulls the train. The extra power is moved from one location to another in tow. |
| $y_{i,j}^{s,c}(\tau)$ | Number of locomotives of signaling category s, power class c arriving at location i from adjacent location j as extra power during the time interval $(\tau, \tau + 1)$. | Same as above. |
| Static entities | | |
| $B_{i,j}^{s,c}(\tau)$ | Number of locomotive of class c and signaling category s planned to arrive at location i from direction j during the time interval $(\tau, \tau + 1)$. | These are locomotives already on route when the optimization begins. |
| $C^c$ | The cost of using a locomotive of class c as active power at maximum capacity. | In $ per mile. |
| $K_{i,j}$ | The capacity of the corridor between locations i and j. | |
| $\Delta_{i,t}$ | The traveling distance of train t originating at location i. | In miles. |
| $D_{i,j}$ | The distance between location i and adjacent location j. | In miles. |
| $\Gamma^c$ | The cost of moving a locomotive of class c as extra power. | In $ per mile. |
| $E^{c,g}$ | The matrix shows the equivalence (compatibility) of different classes of power. | Values 0 (not compatible) or 1 (compatible). |
| $L_i$ | The upper limit of yard capacity. | Number of trains. |
| $M_{i,t}$ | Maximum number of locomotives that can be attached to train t originating at location i. | Prevents assigning of too many small locomotives to a very heavy train. |
| $N_{i,t}$ | Minimum number of locomotives that can be attached to train t originating at location i. | Prevents assigning too few locomotives to a train. |
| $\Pi_i^c(k;k+1)$ | The probability that a locomotive of power class c will be released from maintenance at location i between k and k + 1 hours. | Values in this table reflect technical capabilities of the repair shop at location i as well the frequency of maintenance and repair operations. |
| $R_{i,t}^{s0}(\tau)$ | Power required at location i for train t using signaling category $s_0$ during time interval $(\tau, \tau + 1)$. | In 1000 HP. The model considers that the power is available and can be scheduled to move to the departure yard within the $(\tau, \tau + 1)$ interval. |
| $S_s^{s0}$ | Signaling compatibility matrix. | Equal to one if signaling system s installed on locomotive can support the track signaling requirement $S_0$. |
| $\Theta_{i,j}$ | The time for traveling from location i to adjacent location j. | In time intervals. |
| $\theta_{i,t}$ | Time needed to complete the departure procedures at location i (travel from locomotive shop to departure yard, charging the brake system, inspection, brake testing,etc.). | In time intervals. |
| $U^c$ | The power of one locomotive in power class c. | In 1000 HP. |
| Dynamic entities | | |
| $A_i^{s,c}(\tau)$ | Number of locomotives of power class c and cab signaling s available at location i at the beginning of the time interval $(\tau, \tau + 1)$. | Integer number. |
| $\Lambda_i(\tau)$ | Number of trains at location i at the beginning of the time interval $(\tau, \tau + 1)$. | |
| $N_i^{s,c}(\tau)$ | Number of locomotives of power class c and cab signaling s entering the fleet at location i during the time interval $(\tau, \tau + 1)$. | These locomotives can be on loan, new acquisitions, refurbished or foreign. |
| $P_{i,t}(\tau)$ | Penalty for not providing power to train t at location i during time interval $(\tau, \tau + 1)$. | In $ per time period. $P_{i,t}(\tau, \tau < \tau_0) = 0$ where $\tau_0$ is the time when the train power should be scheduled. |

TABLE 1-continued

| Symbol | Meaning | Comments |
| --- | --- | --- |
| $Q_i^{s,c}(\tau)$ | Number of locomotives of power class c and cab signaling s exiting the fleet at location i during the time interval $(\tau, \tau + 1)$. | Those locomotives can retire, be removed from the fleet for major repairs or be returned to a foreign owner. |
| $W_{i,t}^{s0,c}(\tau)$ | The availability plan for the crew operating the lead locomotive of class c on train t originating at location i during the time interval $(\tau, \tau + 1)$. | Plan generated by the crew management system. |
| $Z_i^{s,c}(\tau)$ | Number of locomotives of power class c and cab signaling s released from maintenance shops at location i during the time interval $(\tau, \tau + 1)$. | |
| Auxiliary entities | | |
| $\delta_{i,t}(\tau)$ | Logical variable associated with train t at location i during the time interval $(\tau, \tau + 1)$. | 1 = train gets required power during the time interval $(\tau, \tau + 1)$, 0 = train does not get power during the time interval $(\tau, \tau + 1)$. |
| $u_i^{s,c}(\tau)$ | Number of locomotives of category s and power class c assigned to trains leaving the location i during the time interval $(\tau, \tau + 1)$. | |

The Algorithmic Process

The process includes seven elements: local power assignment, network balance, receiving yard balance, locomotive shop release, network-location balance, dynamic relations and the objective function.

The local power assignment element deals with the operation, at the location of interest, of assigning locomotives to trains. The network balance contains constraints linking each location with other locations within the network. The receiving yard balance counts the number of locomotives arriving at the location within each time interval. The locomotive shop operations are represented as delays between the moment a locomotive enters the receiving yard until it becomes available for assignment. The network-location constraints assure that the number of locomotives assigned to all locations is not larger than the number of locomotives actually available in the system. In another embodiment, this section could reflect the rental availability of locomotives. The dynamic relations link one time interval with the next time interval.

All these elements are represented by a system of constraints that can have many feasible solutions. The best solution is the one that minimizes: the cost of moving extra power across the network, the total penalties paid on the whole network and the total direct cost of moving the freight across the network. The process presented is in a class of mixed integer linear problems that can be solved using either linear methods (known as Danzig-Wolfe methods) or interior point methods. Such minimization solution methods are well known by those skilled in the art.

Local Power Assignment

The assignment of locomotive to trains should reflect the following facts:

a) a train should either have as much power as required, or none (that is, the train is delayed or cancelled), b) the set of locomotives assigned to a train should be from the same power group, c) the set of locomotives assigned to train should have at least one locomotive (used as the lead) supporting the required cab signaling system of the track over which it will travel.

$$\sum_{s \in S} \sum_{c \in C} a_{i,t}^{s,c}(\tau) U^c E^{c,g} \geq \alpha_{i,t}^g(\tau) R_{i,t}^{s0}(\tau) \qquad (3\text{-}1)$$

$$\alpha_{i,t}^g(\tau) \in Z^+ \qquad \forall\, i \in Y, t \in \bigcup_{j \in N_i} T_{i,j},\, g \in G$$

$$R_{i,t}^{s0}(\tau) = \begin{cases} \tau < \tau_0 \rightarrow 0 \\ \tau \geq \tau_0 \rightarrow R_{i,t}^{s0}(\tau_0) \end{cases}$$

Equation (3-1) assures that whatever locomotive assignment is made, the assigned power is at least equal to the required power. According to this equation, the $\alpha_{i,j}^g(\tau)$ variables can have only integer, not negative, values.

$$\sum_{g \in G} \alpha_{i,t}^g(\tau) = \delta_{i,t}(\tau) - \delta_{i,t}(\tau - 1) \quad \forall\, i \in Y, t \in \bigcup_{j \in N_i} T_{i,j} \qquad (3\text{-}2)$$

$$\begin{aligned} \delta_{i,t}(\tau) \leq 1 \\ \delta_{i,t}(\tau; \tau < \tau_0) = 0 \end{aligned} \quad \forall\, i \in Y, t \in \bigcup_{j \in N_i} T_{i,j} \qquad (3\text{-}3)$$

Equation 3-2 accounts for the dynamic characteristics. According to equation (3-2), all values of the $\alpha_{i,t}^g(\tau)$ variables associated with the same train and representing all power groups, added together, equal no more than one. Since all $\alpha_{i,t}^g(\tau)$ are non-negative integers, this means that no more than one value of the variables is equal to one, while all others are zero. This reflects the fact that all assigned locomotives to the same train should be from the same power group.

The train travels in a region requiring signaling capability of category so. This means that from all assigned locomotives at least one should support this category of signaling. This locomotive will occupy the lead position in the train.

$$\sum_{c \in C} E^{c,g} \sum_{s \in S} S_s^{s0} a_{i,t}^{s,c}(\tau) \geq \alpha_{i,t}^g(\tau) \quad \forall\, i \in \bigcup_{j \in N_i} T_{i,j},\, g \in G \qquad (3\text{-}4)$$

The inequality sign used in equation (3-4) makes sure that at least one locomotive of the assigned power group has the equipment for signaling category s, but assigning more than one such locomotive is acceptable.

The crew driving the train should be qualified to operate a locomotive with power class c and with the itinerary of train t originating at location i.

$$a_{i,t}^{s_0,c}(\tau) = w_{i,t}^{s_0,c}(\tau) W_{i,t}^{s_0,c}(\tau)$$
$$w_{i,t}^{s_0,c}(\tau) \in Z^+ \quad \forall\, i \in Y,\, t \in \bigcup_{j \in N_i} T_{i,j},\, c \in C \quad (3\text{-}5)$$

Equation (3-5) assures that the locomotive selected as lead can be operated by the crew mentioned in the availability plan. Since federal regulations require that engineers be qualified for the trip route, not necessarily for the type of equipment used on the trip, all values of $W_{i,t}^{s_0,c}(\tau)$ should be equal across the c coordinate in the United States. That is, the values within the matrix will be identical along the dimension c (for each value of c). There will be no differentiation caused by different values of index c specifying the type of equipment. In other countries where there are many different types of locomotives, each requiring a particular skill set to operate, or where the engineers are required to perform maintenance on the engine, the situation would be expressed differently by the matrix. A particular engineer might be qualified for only some type of equipment, which would change the availability matrix along the dimension c. In other words, for different values of c the matrix could have different values, even if all other indices are kept constant.

The total number of locomotives used for powering all trains at location i by each power class c and cab-signaling s is computed with equation (3-6).

$$\sum_{t \in \bigcup_{j \in N_i} T_{i,j}} a_{i,t}^{s,c}(\tau) = u_i^{s,c}(\tau) \quad \forall\, i \in Y,\, s \in S,\, c \in C \quad (3\text{-}6)$$

Equation (3-7) restricts the number of locomotives that can be used for powering a train.

$$N_{i,t} \le \sum_{s \in S} \sum_{c \in C} a_{i,t}^{s,c}(\tau) \le M_{i,t} \quad \forall\, i \in \bigcup_{j \in N_i} T_{i,j} \quad (3\text{-}7)$$

The relation has the effect of preventing the assignment of too many or too few locomotives to a heavy train.

Network Balance

Equations in this category are responsible for balancing the locomotive power in the network. The number of locomotives for cab signaling category s and power class C available at location i during the time interval $(\tau, \tau+1)$ is $p_i^{s,c}(\tau)$ $$p_i^{s,c}(\tau) = \qquad (3\text{-}8)$$
$$A_i^{s,c}(\tau) + \sum_{j \in N_i} y_{j,i}^{s,c}(\tau) - \sum_{j \in N_i} x_{i,j}^{s,c}(\tau) + Z_i^{s,c}(\tau) + N_i^{s,c}(\tau) - Q_i^{s,c}(\tau)$$
$$\forall\, i \in Y,\, s \in S,\, c \in C$$

Equation (3-8) indicates the total number of locomotives available to be assigned at location i, taking into account the locomotives already available at the location, the incoming extra power from all neighboring locations, the extra power leaving for all neighboring locations, locomotives released from maintenance shops, as well as locomotives entering and exiting the fleet at location i.

The extra power arriving in a yard during the time interval $(\tau, \tau+1)$ left the originating location $\Theta_{i,j}\theta_{i,t}$ "hours" ago, as presented in equation (3-9). The extra power should be coming in tow to location i, therefore it does will not need any maintenance and can be immediately assigned to trains departing from location i.

$$y_{j,i}^{s,c}(\tau) = \sum_{j \in N_i} x_{i,j}^{s,c}(\tau - \Theta_{i,j} - \theta_{i,j}) \qquad (3\text{-}9)$$
$$\forall\, i, j \in Y,\, s \in S,\, c \in C$$
$$x_{i,j}^{s,c}(\tau;\, \tau < 0) = 0$$

Receiving Yard Balance

The number of locomotives arriving at location i as active power during the time interval $(\tau, \tau+1)$ depends on the departure time from other locations and the duration of each trip.

$$\rho_i^{s,c}(\tau) = \sum_{j \in N_i} \sum_{t \in T_{j,i}} a_{j,t}^{s,c}(\tau - \Theta_{j,i} - \theta_{j,t}) + \sum_{j \in N_i} B_{j,i}^{s,c}(\tau) \quad (3\text{-}10)$$
$$\forall\, i \in Y,\, s \in S,\, c \in C$$

Equation (3-10) shows that locomotives arriving within the time interval $(\tau, \tau+1)$ have been subject to an assignment at time $\tau - \Theta_{j,i} - \theta_{j,t}$.

Locomotive Shop Release

Locomotives are released from the maintenance shop according to the length of the maintenance procedure and/or inspection and shop productivity.

$$Z_i^{s,c}(\tau) = \left[ \sum_k \rho_i^{s,c}(\tau - k) \prod_i^c (k; k+1) \right] \qquad (3\text{-}11)$$
$$Z_i^{s,c}(\tau) \in Z^+ \quad \forall\, i \in Y,\, s \in S,\, c \in C$$

The expression between brackets should be rounded to the nearest integer to provide the number of locomotives.

Connection Between Network Availability and Local Request

Obviously, the total number of locomotives used at a location defined in equation (3-6), cannot be larger than the number available at the location as defined in equation (3-8). This is expressed below in equation (3-12).

$$u_i^{s,c}(\tau) \le p_i^{s,c}(\tau) \forall i \in Y, s \in S, c \in C \qquad (3\text{-}12)$$

Corridor Capacity

The number of trains scheduled over a corridor should not be larger than the corridor capacity for time interval of interest.

$$\sum_{g \in G} \sum_{t \in T_{i,j}} a_{i,j}^g(\tau) \le K_{i,j} \quad \forall\, i \in Y,\, j \in N_i \qquad (3\text{-}13)$$

This relation restricts the number of trains leaving from location i toward location j to the specified number of trains per planning interval.

Yard Capacity

As expressed below, the total number of trains in a yard at any particular time should be smaller than yard capacity.

$$\Lambda_i(\tau) + \sum_{g \in G} \left( \sum_{j \in N_i} \alpha_{j,t}^g(\tau - \Theta_{j,i} - \theta_{j,t}) - \sum_{t \in \bigcup_{j \in N_i} T_{i,j}} \alpha_{i,t}^g(\tau) \right) = \Lambda(\tau + 1) \quad \forall i \in Y \quad (3\text{-}14)$$

$$\Lambda_i(\tau) \leq L_i$$

Dynamic Relations

Now we consider the set of equations making the link between variables representing one time interval and variables of the next time interval.

$$A_i^{s,c}(\tau+1) = p_i^{s,c}(\tau) - u_i^{s,c}(\tau) \forall i \in Y, s \in S, c \in C \quad (3\text{-}15)$$

Equation (3-15) computes the availability of locomotives at the beginning of a new time interval as the difference between the total power available during the previous time interval, minus those locomotives that were assigned to trains. Based on equation (3-12), $A_i^{s,c}(\tau+1)$ is always a non-negative number.

Because the time when a train can depart is known in advance, the system of equations should be written so that the train can depart at anytime, and then let the optimization process discussed below select the best departure time.

Equation (3-2) included the variable $\delta_{i,t}(\tau)$. Its value is one only if the train has enough power and can leave the yard.

$$\begin{aligned} \delta_{i,t}(\tau+1) \geq \delta_{i,t}(\tau) \\ \delta_{i,t}(\tau+1) \leq 1 \end{aligned} \quad \forall i \in Y, t \in \bigcup_{j \in N_i} T_{i,j} \quad (3\text{-}16)$$

Both equations labeled (3-16) above (note, the second equation of (3-16) is simply a rewrite of equation (3-3) at time ($\tau+1$) propagate the value of the $\delta_{i,t}(\tau)$ variable from the moment the train was assigned power, forward in time. An example of the time sequence of values for this variable for the same train is: 0,0, . . . ,0,1,1,1, . . . ,1, where the first zero corresponds to the planned time when the power should be assign (that is, the estimated time of departure less the duration of departure yard operations), and the first one corresponds to the time when the train was assigned power.

Because $\delta_{i,t}(\tau)$ acts like a step function, equation (3-2) provides a set of constraints where only one value of $\alpha_{i,t}^g(\tau)$ can be equal to one at any time. It assures that all locomotives assigned to a train are in one power group only.

Objective Function

The objective function below provides a measure of profitability of the whole operation. To perform a truly economical optimization, it would be necessary to know the unit cost and unit revenue for each type of service provided, plus general overhead costs. With this additional information, a complete economic analysis could be performed and the business profitability optimized. The optimization analysis here is therefore incomplete because there is no economic analysis. The optimization process does not necessarily imply that the operation will be more profitable if the derived optimization solution is implemented. The implementation will no doubt cut costs, but may, in fact, also create a revenue decline.

Generally, with no additional constraints and using a criteria of cost minimization only, in the limit the conclusion would be to close a business because that is the only way to achieve the smallest possible cost (i.e., zero). The algorithm of the present invention attempts to minimize the cost using a constraint that all goods are to be moved in accord with the customer's schedule. In this algorithm we minimize the global cost of the operation.

$$\min \sum_r \left( \begin{array}{l} \sum_{i \in Y} \sum_{j \in N_i} \sum_{s \in S} \sum_{c \in C} x_{i,j}^{s,c}(\tau) D_{i,j} \Gamma^c + \\ \sum_{i \in Y} \sum_{t \in \bigcup_{j \in N_i} T_{i,j}} (1 - \delta_{i,t}(\tau)) P_{i,t}(\tau) + \\ \sum_{i \in Y} \sum_{t \in \bigcup_{j \in N_i} T_{i,j}} \sum_{s \in S} \sum_{c \in C} \alpha_{i,t}^{s,c}(\tau) C^c \Delta_{i,t} \end{array} \right) \quad (3\text{-}17)$$

The first term under the summation evaluates the cost of moving the extra power in the network. It is the product of the number of moved locomotives, the distance between locations and the cost per mile for towing a locomotive.

The second term evaluates the penalties paid for not powering a train in time. The $\delta_{i,t}(\tau)$ variable has the value one when the train has power to move and zero when it cannot move. The objective function has a summation over time, which makes it possible to count the cost of departure delays. The value of the penalty per time unit is static, but it can be different from one hour to another.

The third term evaluates the cost of operating the train using a particular power class. This term tells the optimization process to select the most productive equipment for doing the job. The cost is in proportion to the distance $\Delta_{i,t}$, and the cost per mile $C^c$ associated with the power class.

Those skilled in the optimization art will realize that the size of the model can be reduced using algebraic substitutions. Such reduction is useful for decreasing the size of the data involved in the optimization process, therefore increasing the execution speed.

Equation (3-1) is used in the form $$\sum_{s \in S} \sum_{c \in C} a_{i,t}^{s,c}(\tau) U^c E^{c,g} - \alpha_{i,t}^g(\tau) R_{i,t}^{s_0}(\tau) \geq 0 \quad \forall i \in Y, t \in \bigcup_{j \in N_i} T_{i,j}, g \in G \quad (5\text{-}1)$$

Equation (5-1) will generate $|T||G|$ constraints, where $|X|$ is the cardinality of set X.

Equations (3-2), (3-3) and (3-4) are modified as follows, in one embodiment of the present invention.

$$\sum_{g \in G} \alpha_{i,t}^g(\tau) - \delta_{i,t}(\tau) + \delta_{i,t}(\tau - 1) = 0 \quad \forall i \in Y, t \in \bigcup_{j \in N_i} T_{i,j} \quad (5\text{-}2)$$

$$\delta_{i,t}(\tau) \leq 1 \quad \forall i \in Y, t \in \bigcup_{j \in N_i} T_{i,j} \quad (5\text{-}3)$$

$$\sum_{c \in C} E^{c,g} \sum_{s \in S} S_s^{s_0} a_{i,t}^{s,c}(\tau) - \alpha_{i,t}^g(\tau) \geq 0 \quad \forall i \in Y, t \in \bigcup_{j \in N_i} T_{i,j}, g \in G \quad (5\text{-}3)$$

The number of constraints generated from equations (5-2) and (5-3) is equal to $2|T|$, while equation (5-3) generates $|T||G|$ constraints. If crew management is not of interest, equation (3-5) should not be used.

The minimum limit on number of locomotives attached to a train is not a concern. In such a case, equation (3-7) can be used for limiting the maximum number of trains only.-

Equation (5-5) below, derived from equation (3-7), generates |T| constraints.

$$\sum_{s \in S} \sum_{c \in C} a_{i,t}^{s,c}(\tau) \leq M_{i,t} \quad \forall\, i \in Y, t \in \bigcup_{j \in N_i} T_{i,j} \qquad (5\text{-}5)$$

The network balance equation (3-8) can be combined with (3-6), (3-9), (3-10), (3-11) and (3-15). The result is:

$$\sum_{j \in N_i} x_{j,i}^{s,c}(\tau - \Theta_{i,j} - \theta_{i,t}) - \sum_{j \in N_i} x_{i,j}^{s,c}(\tau) + \qquad (5\text{-}6)$$

$$\sum_{k=0}^{\Pi_i^c(k)>0} \left( \sum_{j \in N_i} \sum_{t \in T_{j,i}} a_{j,i}^{s,c}(\tau - k - \Theta_{j,i} - \theta_{j,t}) \right) \prod_i^c (k) -$$

$$\sum_{t \in \bigcup_{j \in N_i} T_{i,j}} a_{i,j}^{s,c}(\tau) + N_i^{s,c}(\tau) - Q_i^{s,c}(\tau) - \sum_{t \in \bigcup_{j \in N_i} T_{i,j}} a_{i,t}^{s,c}(\tau) -$$

$$A_i^{s,c}(\tau) + A_i^{s,c}(\tau - 1) = \sum_{k=0}^{\Pi_i^c(k)>0} \left( \sum_{j \in N_i} \sum_{t \in T_{j,i}} B_{j,i}^{s,c}(\tau - k) \right) \prod_i^c (k)$$

$$\forall\, i \in Y, s \in S, c \in C$$

The network balance is considered for all yards, for each signaling category and for each power class. Equation (5-6) generates |Y||S||C| constraints.

The constraints for corridor and yard capacity are $$\sum_{g \in G} \sum_{t \in T_{i,j}} \alpha_{i,t}^{g}(\tau) \leq K_{i,j} \quad \forall\, i \in Y, j \in N_i \qquad (5\text{-}7)$$

The total number of constraints generated with equation (5-7) is |K|, the number of corridors in network.

$$\Lambda_i(\tau) + \sum_{g \in G} \left( \sum_{j \in N_i} \alpha_{j,i}^{g}(\tau - \Theta_{j,i} - \theta_{j,t}) - \sum_{t \in \bigcup_{j \in N_i} T_{i,j}} \alpha_{i,t}^{g}(\tau) \right) - \qquad (5\text{-}8)$$

$$\Lambda(\tau + 1) = 0 \quad \forall\, i \in Y$$

$$\Lambda_i(\tau) \leq L_i$$

Equations (5-8) generate 2|Y| more constraints.

The train assignment step function is controlled by the relation $$\delta_{i,t}(\tau + 1) - \delta_{i,t}(\tau) \geq 0 \quad \forall\, i \in Y, t \in \bigcup_{j \in N_i} T_{i,j} \qquad (5\text{-}9)$$

It generates another |T| constraints.

The second term of the objective function is decomposed and the constant value $$\sum_{\tau} \sum_{i \in Y} \sum_{t \in \bigcup_{j \in N_i} T_{i,j}} P_{i,t}(\tau)$$

can be ignored while searching for the optimal solution.

The function to optimize is then:

$$\min \sum_{\tau} \left\{ \begin{array}{l} \sum_{i \in Y} \sum_{j \in N_i} \sum_{s \in S} \sum_{c \in C} x_{i,j}^{s,c}(\tau) D_{i,j} \Gamma^c - \\ \sum_{i \in Y} \sum_{t \in \bigcup_{j \in N_i} T_{i,j}} \delta_{i,t}(\tau) P_{i,t}(\tau) + \\ \sum_{i \in Y} \sum_{t \in \bigcup_{j \in N_i} T_{i,j}} \sum_{s \in S} \sum_{c \in C} a_{i,t}^{s,c}(\tau) C^c \Delta_{i,t} \end{array} \right\} \qquad (5\text{-}10)$$

The total number of constraints for this problem is then $$2|T||G| + 4|T| + |Y||S||C| + |K| + 2|Y| \qquad (5\text{-}11)$$

The number of variables is computed as follows:

$$a_{i,t}^{s,c} \qquad |T||S||C|$$

$$\alpha_{i,t}^{g}(\tau) \qquad |T||G|$$

$$\delta_{i,t}(\tau) \qquad |T|$$

$$\sum_{j \in N_i} x_{i,j}^{s,c}(\tau) \qquad |K||S||C|$$

The linear problem generated with this model has a number of slack variables (compensating for the inequalities) equal to 2|T||G|+3|T|+|K|+|Y|. In order to find the size of the problem, the number of unknown variables, slack variables and constraints are multiplied by the number of time intervals considered in problem horizon. Those skilled in the art will realize that various computer-based techniques can be employed for optimizing the objective function, including the techniques set forth in *Large Scale Linear and Integer Optimization—A Unified Approach*, by Richard Kipp Martin, 1999.

FIG. 1 is a block diagram of a locomotive assignment planner 10 constructed according to the teachings of the present invention. The locomotive assignment planner 10 includes an optimizer 12, incorporating the process of the present invention, that receives as an input the stored train schedule from an element 14 and the current status of all locomotives from an element 16. The stored train schedule includes the desired departure and arrival time of the trains operating on the network. The output from the optimizer 12 is the optimized locomotive assignments.

Figure 2:
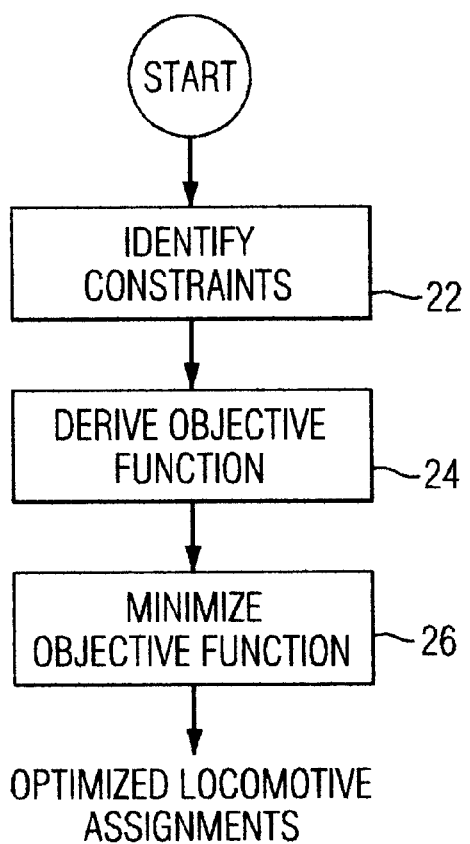
FIG. 2 is a flow diagram illustrating operation of the present invention.

The flow chart of FIG. 2 illustrates the operation of the present invention. At a step 22, the constraints set forth in equations (5-1) through (5-9) are identified. The objective function of equation (5-10) is calculated at a step 24. At a step 26 the objective function is minimized to provide the optimized locomotive assignments. As is well known by those skilled in the art, these steps can be carried out by a general purpose computer.

Figure 3:
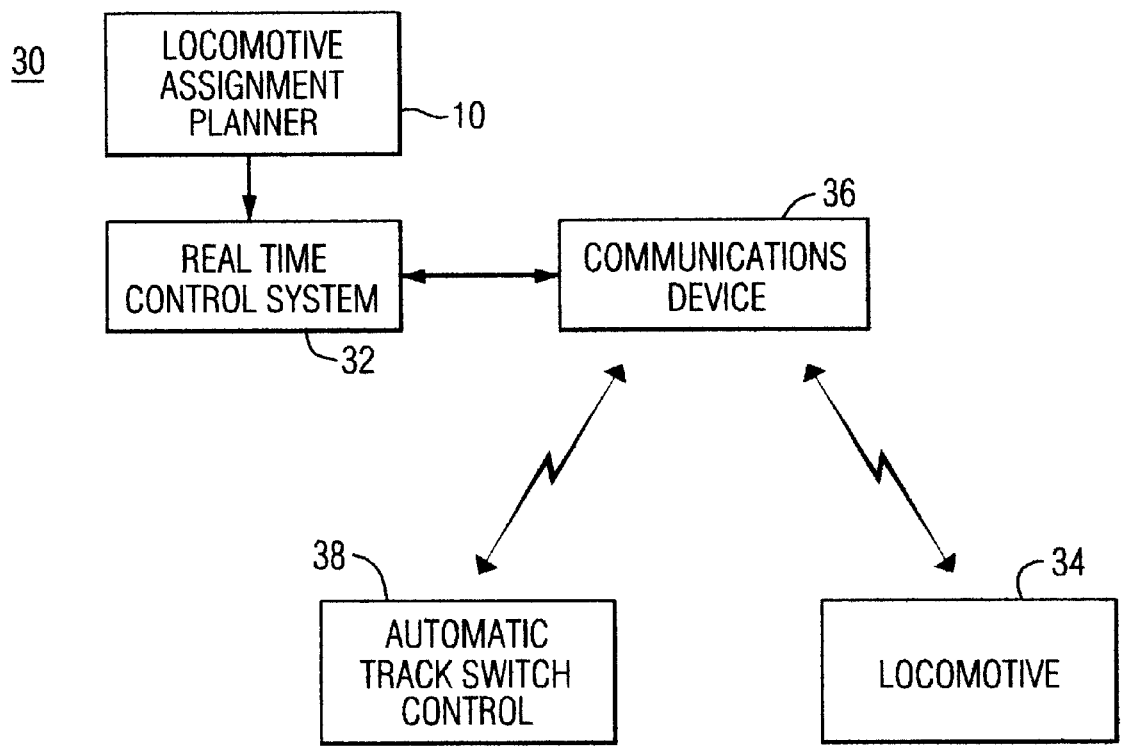
FIG. 3 is a block diagram illustrating the incorporation of the present invention into a real-time railroad dispatching system.

FIG. 3 is a block diagram of the real-time dispatcher system 30. The locomotive assignment planner 10 provides the optimized locomotive assignment schedule to a real-time control system 32, which dispatches the trains and controls the track switches. The real-time control system 32 is in communications with locomotives 34 via a communications device 36. Dispatching information can be sent to the locomotives 34 either through an RF link or through a track-based system. The real-time control system 32 also controls the track switches (illustrated by element 38) to properly route the trains, via the communications device 36.

While the invention has been described with reference to a preferred embodiment, it will be understood by those skilled in the art that various changes may be made and equivalence may be substituted for elements thereof without the parting from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method for optimizing the assignment of locomotives in a railroad network by minimizing a cost of moving locomotives in the network over a predetermined time period, $\tau$, wherein each locomotive is within a signaling class s from a set of signaling classes S, and wherein each locomotive is within a power class c from a set of power classes C, and wherein the distance $D_{i,j}$ between locations i and j on the network is known, and the cost of moving locomotives $\Gamma^c$ as extra power as a function of power class is known, said method comprising the steps of:

(a) determining the number of locomotives of signaling class s and power class c that are planned to exit location i in the direction of location j as extra power during the predetermined time period $\tau$;

(b) determining the product of the result of step (a) for each power class, the distance between locations i and j, and the cost of moving locomotives as extra power as a function of each power class c;

(c) summing the result of step (b) over all power classes;

(d) summing the result of step (c) over all signaling classes, (e) summing the result of step (d) over all adjacent locations j;

(f) summing the result of step (e) over all locations i;

(g) summing the result of step (f) over the predetermined time period $\tau$; and (h) minimizing the result of step (g).

2. The method of claim 1 wherein the execution of step (h) is subject to the following constraint, $$\sum_{s \in S} \sum_{c \in C} a_{i,t}^{s,c}(\tau) U^c E^{c,g} - \alpha_{i,t}^g(\tau) R_{i,t}^{s_0}(\tau) \geq 0 \quad \forall\, i \in Y, t \in \bigcup_{j \in N_i} T_{i,j}, g \in G,$$

wherein $a_{i,t}^{s,c}(\tau)$ represents a number of locomotives of power class c cab signaling type s assigned to train t initiated at location i during a time interval $(\tau, \tau+1)$, and wherein $U^c$ represents a power of one locomotive in power class c, and wherein $E^{c,g}$ represents a matrix showing equivalence of different power classes, and wherein $\alpha_{i,t}^g(\tau)$ is an indicator for marking that a train t at a location i is powered with locomotives from a power group g, and wherein $R_{i,t}^{s_0}(\tau)$ is power required at location i for train t using signaling category $s_0$ during a time interval $(\tau, \tau+1)$, and wherein Y is a set of locations in the network, and wherein $T_{i,j}$ is a set of trains at location i planned to move to location j, and wherein g is an index for marking a locomotive group of power, and wherein G represents a set of groups of power, and wherein $N_i$ represents a set of locations adjacent to location i.

3. The method of claim 1 wherein the execution of step (h) is subject to the following constraints, $$\sum_{g \in G} \alpha_{i,t}^g(\tau) - \delta_{i,t}(\tau) + \delta_{i,t}(\tau-1) = 0 \quad \forall\, i \in Y, t \in \bigcup_{j \in N_i} T_{i,j}$$

$$\delta_{i,t}(\tau) \leq 1 \quad \forall\, i \in Y, t \in \bigcup_{j \in N_i} T_{i,j}$$

$$\sum_{c \in C} E^{c,g} \sum_{s \in S} S_s^{s_0} a_{i,t}^{s,c}(\tau) - \alpha_{i,t}^g(\tau) \geq 0 \quad \forall\, i \in Y, t \in \bigcup_{j \in N_i} T_{i,j}, g \in G,$$

wherein $\alpha_{i,t}^g(\tau)$ is an indicator for marking that a train t at a location i is powered with locomotives from a power group g, and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j, and wherein g is an index for marking a locomotive group of power, and wherein $E^{c,g}$ represents a matrix showing equivalence of different power classes, and wherein $\alpha_{i,t}^{s,c}(\tau)$ represents a number of locomotives of power class c cab signaling type s assigned to train t initiated at location i during a time interval $(\tau, \tau+1)$, and wherein G represents a set of groups of power, and wherein $N_i$ represents a set of locations adjacent to location i.

4. The method of claim 1 wherein the execution of step (h) is subject to the following constraint, $$\sum_{s \in S} \sum_{c \in C} a_{i,t}^{s,c}(\tau) \leq M_{i,t} \quad \forall\, i \in Y, t \in \bigcup_{j \in N_i} T_{i,j},$$

and wherein $a_{i,t}^{s,c}(\tau)$ represents a number of locomotives of power class c cab signaling type s assigned to train t initiated at location i during a time interval $(\tau, \tau+1)$, and wherein $M_{i,t}$ represents a maximum number of locomotives that can be attached to train t originating at location i, and wherein Y is a set of locations in the network, and wherein $T_{i,j}$ is a set of trains at location i planned to move to location j, and wherein $N_i$ represents a set of locations adjacent to location i.

5. The method of claim 1 wherein the execution of step (h) is subject to the following constraints, $$\sum_{j \in N_i} x_{j,i}^{s,c}(\tau - \Theta_{i,j} - \theta_{i,t}) - \sum_{j \in N_i} x_{i,j}^{s,c}(\tau) +$$

$$\sum_{k=0}^{\Pi_i^c(k)>0} \left( \sum_{j \in N_i} \sum_{t \in T_{j,i}} a_{j,t}^{s,c}(\tau - k - \Theta_{j,i} - \theta_{j,t}) \right) \prod_i^c (k) - \sum_{t \in \bigcup_{j \in N_i} T_{i,j}} a_{i,t}^{s,c}(\tau) +$$

$$N_i^{s,c}(\tau) - Q_i^{s,c}(\tau) - \sum_{t \in \bigcup_{j \in N_i} T_{i,j}} a_{i,t}^{s,c}(\tau) - A_i^{s,c}(\tau) + A_i^{s,c}(\tau - 1) =$$

$$\sum_{k=0}^{\Pi_i^c(k)>0} \left( \sum_{j \in N_i} \sum_{t \in T_{j,i}} B_{j,i}^{s,c}(\tau - k) \right) \prod_i^c (k)$$

$$\forall\, i \in Y, s \in S, c \in C$$

and wherein $N_i$ represents a set of locations adjacent to location i, and wherein $x_{i,j}^{s,c}(\tau)$ represents a number of locomotives of signaling category s, power class c, planned to exit location i and directed to adjacent location j as extra power during the time interval $(\tau, \tau+1)$, and wherein $\Theta_{i,j}$ represents a time for traveling from location i to adjacent location j, and wherein $\theta_{i,t}$ represents a time needed to complete the departure procedures at location i (travel from locomotive shop to departure yard, charging the brake system, inspection, brake testing, etc.), and wherein $\Pi_i^c(k; k+1)$ represents a probability that a locomotive of power class c will be released from maintenance at location i between k and k+1 hours, and wherein $a_{i,t}^{s,c}(\tau)$ represents a number of locomotives of power class c cab signaling type s assigned to train t initiated at location i during a time interval $(\tau, \tau1)$, and wherein $N_i^{s,c}(\tau)$ represents a number of locomotives of power class c and cab signaling s entering the fleet at location i during the time interval $(\tau, \tau+1)$, and wherein $Q_i^{s,c}(\tau)$ represents a number of locomotives of power class c and cab signaling s exiting the fleet at location i during the time interval $(\tau, \tau1)$, and wherein $A_i^{s,c}(\tau)$ represents a number of locomotives of power class c and cab signaling s available at location i at the beginning of the time interval $(\tau, \tau+1)_L$ and wherein $B_{i,j}^{s,c}(\tau)$ represents a number of locomotive of class c and signaling category s planned to arrive at location i from direction j during the time interval $(\tau, \tau+1)$, and wherein Y is a set of locations in the network.

6. The method of claim 1 wherein the execution of step (h) is subject to the following constraint, $$\sum_{g \in G} \sum_{t \in T_{i,j}} \alpha_{i,j}^g(\tau) \leq K_{i,j} \quad \forall\, i \in Y, j \in N_i,$$

and wherein $\alpha_{i,t}^g(\tau)$ is an indicator for marking that a train t at a location i is powered with locomotives from a power group g, and wherein $K_{i,j}$ represents a capacity of the corridor between locations i and j, and wherein and wherein Y is a set of locations in the network, and wherein $N_i$ represents a set of locations adjacent to location i.

7. The method of claim 1 wherein the execution of step (h) is subject to the following constraints, $$\Lambda_i(\tau) + \sum_{g \in G}\left(\sum_{j \in N_i} \alpha_{j,t}^g(\tau - \Theta_{j,i} - \theta_{j,t}) - \sum_{t \in \bigcup_{j \in N_i} T_{i,j}} \alpha_{i,t}^g(\tau)\right) - \Lambda(\tau+1) = 0$$

$$\Lambda_i(\tau) \leq L_i$$

wherein $\Lambda_i(\tau)$ represents a number of trains at location i at the beginning of the time interval $(\tau, \tau-1)$, and wherein $\alpha_{i,t}^g(\tau)$ is an indicator for marking that a train t at a location i is powered with locomotives from a power group g, and wherein $\Theta_{i,j}$ represents a time for traveling from location i to adjacent location j, and wherein $\theta_{i,t}$ represents a time needed to complete the departure procedures at location i (travel from locomotive shop to departure yard, charging the brake system, inspection, brake testing, etc.), and wherein, $L_i$ represents the upper limit of yard capacity.

8. The method of claim 1 wherein the execution of step (h) is subject to the following constraint, $$\delta_{i,t}(\tau+1) - \delta_{i,t}(\tau) \geq 0 \quad \forall\, i \in Y, t \in \bigcup_{j \in N_i} T_{i,j},$$

and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j.

9. The method of claim 1 including additional step (i) of scheduling the movement of the locomotives based on the result of step (h).

10. A method for optimizing the assignment of locomotives in a railroad network by minimizing a penalty associated with late train departures, wherein the penalty incurred $P_{i,t}(\tau)$ if a train t at a location i does not have power over the predetermined time period $\tau$ is known, said method comprising the steps of:

(a) determining whether a train t is powered during the predetermined time interval $\tau$;

(b) assigning a first value to each train t if the train t does not have power and assigning a second value to each train t if the train t does have power;

(c) multiplying the result of step (b) by the penalty incurred;

(d) summing the result of step (c) over all trains t moving between locations i and j;

(e) summing the result of step (d) over all locations i;

(f) summing the result of step (e) over the predetermined time period $\tau$; and (g) minimizing the result of step (f).

11. The method of claim 10 wherein the execution of step (g) is subject to the following constraint, $$\sum_{s \in S} \sum_{c \in C} a_{i,t}^{s,c}(\tau) U^c E^{c,g} - \alpha_{i,t}^g(\tau) R_{i,t}^{s_0}(\tau) \geq 0 \quad \forall\, i \in Y, t \in \bigcup_{j \in N_i} T_{i,j}, g \in G,$$

wherein $a_{i,t}^{s,c}(\tau)$ represents a number of locomotives of power class c cab signaling type s assigned to train t initiated at location i during a time interval $(\tau, \tau+1)$, and wherein $U^c$ represents a power of one locomotive in power class c, and wherein $E^{c,g}$ represents a matrix showing equivalence of different power classes, and wherein $\alpha_{i,t}^g(\tau)$ is an indicator for marking that a train t at a location i is powered with locomotives from a power group g, and wherein $R_{i,t}^{s_0}(\tau)$ is power required at location i for train t using signaling category $s_0$ during a time interval $(\tau, \tau+1)$, and wherein Y is a set of locations in the network, and wherein $T_{i,j}$ is a set of trains at location i planned to move to location j, and wherein g is an index for marking a locomotive group of power, and wherein G represents a set of groups of power, and wherein $N_i$ represents a set of locations adjacent to location i.

12. The method of claim 10 wherein the execution of step (g) is subject to the following constraints, $$\sum_{g \in G} \alpha_{i,t}^g(\tau) - \delta_{i,t}(\tau) + \delta_{i,t}(\tau-1) = 0 \quad \forall\, i \in Y, t \in \bigcup_{j \in N_i} T_{i,j}$$

$$\delta_{i,t}(\tau) \leq 1 \quad \forall\, i \in Y, t \in \bigcup_{j \in N_i} T_{i,j}$$

$$\sum_{c \in C} E^{c,g} \sum_{s \in S} S_s^{s_0} a_{i,t}^{s,c}(\tau) - \alpha_{i,t}^g(\tau) \geq 0 \quad \forall\, i \in Y, t \in \bigcup_{j \in N_i} T_{i,j}, g \in G,$$

wherein $\alpha_{i,t}^g(\tau)$ is an indicator for marking that a train t at a location i is powered with locomotives from a power group g, and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j, and wherein g is an index for marking a locomotive group of power, and wherein $E^{c,g}$ represents a matrix showing equivalence of different power classes, and wherein $a_{i,t}^{s,c}(\tau)$ represents a number of locomotives of power class c cab signaling type s assigned to train t initiated at location i during a time interval $(\tau, \tau+1)$, and wherein G represents a set of groups of power, and wherein $N_i$ represents a set of locations adjacent to location i.

13. The method of claim 10 wherein the execution of step (g) is subject to the following constraint, $$\sum_{s \in S} \sum_{c \in C} a_{i,t}^{s,c}(\tau) \le M_{i,t} \quad \forall \, i \in Y, t \in \bigcup_{j \in N_i} T_{i,j},$$

and wherein $a_{i,t}^{s,c}(\tau)$ represents a number of locomotives of power class c cab signaling type s assigned to train t initiated at location i during a time interval $(\tau, \tau+1)$, and wherein $M_{i,t}$ represents a maximum number of locomotives that can be attached to train t originating at location i, and wherein Y is a set of locations in the network, and wherein $T_{i,j}$ is a set of trains at location i planned to move to location j, and wherein $N_i$ represents a set of locations adjacent to location i.

14. The method of claim 10 wherein the execution of step (g) is subject to the following constraints, $$\sum_{j \in N_i} x_{j,i}^{s,c}(\tau - \Theta_{i,j} - \theta_{i,t}) - \sum_{j \in N_i} x_{i,j}^{s,c}(\tau) +$$
$$\sum_{k=0}^{\Pi_i^c(k)>0} \left( \sum_{j \in N_i} \sum_{t \in T_{j,i}} a_{j,i}^{s,c}(\tau - k - \Theta_{j,i} - \theta_{j,t}) \right) \prod_i^c (k) -$$
$$\sum_{t \in \bigcup_{j \in N_i} T_{i,j}} a_{i,t}^{s,c}(\tau) + N_i^{s,c}(\tau) - Q_i^{s,c}(\tau) - \sum_{t \in \bigcup_{j \in N_i} T_{i,j}} a_{i,t}^{s,c}(\tau) -$$
$$A_i^{s,c}(\tau) + A_i^{s,c}(\tau - 1) = \sum_{k=0}^{\Pi_i^c(k)>0} \left( \sum_{j \in N_i} \sum_{t \in T_{j,i}} B_{j,i}^{s,c}(\tau - k) \right) \prod_i^c (k)$$

$$\forall \, i \in Y, s \in S, c \in C,$$

and wherein $N_i$ represents a set of locations adjacent to location i, and wherein $x_{i,j}^{s,c}(\tau)$ represents a number of locomotives of signaling category s, power class c, planned to exit location i and directed to adjacent location j as extra power during the time interval $(\tau, \tau+1)$, and wherein $\Theta_{i,j}$ represents a time for traveling from location i to adjacent locations, and wherein $\theta_{i,t}$ represents a time needed to complete the departure procedures at location i (travel from locomotive shop to departure yard, charging the brake system, inspection, brake testing, etc.), and wherein $\Pi_i^c$ (k;k+1) represents a probability that a locomotive of power class c will be released from maintenance at location i between k and k+1 hours, and wherein $a_{i,t}^{s,c}(\tau)$ represents a number of locomotives of power class c cab signaling type s assigned to train t initiated at location i during a time interval $(\tau, \tau+1)$, and wherein $N_i^{s,c}(\tau)$ represents a number of locomotives of power class c and cab signaling s entering the fleet at location i during the time interval $(\tau, \tau+1)$, and wherein $Q_i^{s,c}(\tau)$ represents a number of locomotives of power class c and cab signaling s exiting the fleet at location i during the time interval $(\tau, \tau-1)$, and wherein $A_i^{s,c}(\tau)$ represents a number of locomotives of power class c and cab signaling s available at location i at the beginning of the time interval $(\tau, \tau+1)$, and wherein $B_{i,j}^{s,c}(\tau)$ represents a number of locomotive of class c and signaling category s planned to arrive at location i from direction j during the time interval $(\tau, \tau+1)$, and wherein Y is a set of locations in the network.

15. The method of claim 10 wherein the execution of step (g) is subject to the following constraint, $$\sum_{g \in G} \sum_{t \in T_{i,j}} \alpha_{i,j}^g(\tau) \le K_{i,j} \quad \forall \, i \in Y, j \in N_i,$$

and wherein $\alpha_{i,t}^g(\tau)$ is an indicator for marking that a train t at a location i is powered with locomotives from a power group g, and wherein $K_{i,j}$ represents a capacity of the corridor between locations i and j, and wherein and wherein Y is a set of locations in the network, and wherein $N_i$ represents a set of locations adjacent to location i.

16. The method of claim 10 wherein the execution of step (g) is subject to the following constraints, $$\Lambda_i(\tau) + \sum_{g \in G} \left( \sum_{j \in N_i} \alpha_{j,i}^g(\tau - \Theta_{j,i} - \theta_{j,t}) - \sum_{t \in \bigcup_{j \in N_i} T_{i,j}} \alpha_{i,t}^g(\tau) \right) - \Lambda_i(\tau + 1) = 0$$

$$\Lambda_i(\tau) \le L_i$$

and wherein $\Lambda_i(\tau)$ represents a number of trains at location i at the beginning of the time interval $(\tau, \tau+1)$, and wherein $\alpha_{i,t}^g(\tau)$ is an indicator for marking that a train t at a location i is powered with locomotives from a power group g, and wherein $\Theta_{i,j}$ represents a time for traveling from location i to adjacent location j, and wherein $\theta_{i,t}$ represents a time needed to complete the departure procedures at location i (travel from locomotive shop to departure yard, charging the brake system, inspection, brake testing, etc.), and wherein $L_i$ represents the upper limit of yard capacity.

17. The method of claim 10 wherein the execution of step (g) is subject to the following constraint, $$\delta_{i,t}(\tau + 1) - \delta_{i,t}(\tau) \ge 0 \quad \forall \, i \in Y, t \in \bigcup_{j \in N_i} T_{i,j},$$

and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j.

18. The method of claim 10 including the additional step (h) scheduling the movement of the locomotives based on the result of step (g).

19. A method for optimizing the assignment of locomotives in a railroad network by minimizing a cost of operating trains using a power class c, wherein the cost of using a locomotive of power class c as active power is known and wherein the traveling distance of each train departing from location i is known, said method comprising the steps of:

(a) determining the number of locomotives of power class c and signaling class s assigned to a train t initiated at location i over the predetermined time $\tau$;

(b) calculating the product of the result of step (a), the cost of using a locomotive of power class c as active power in a train t and the distance train t will travel;

(c) summing the result of step (b) over all power classes;

(d) summing the result of step (c) over all signaling classes;

(e) summing the result of step (d) over all trains traveling between locations i and j;

(f) summing the result of step (e) over all locations i on the network;

(g) summing the result of step (f) over the predetermined time τ; and (h) minimizing the result of step (g).

20. The method of claim 19 wherein the execution of step (h) is subject to the following constraint, $$\sum_{s \in S} \sum_{c \in C} a_{i,t}^{s,c}(\tau) U^c E^{c,g} - \alpha_{i,t}^{g}(\tau) R_{i,t}^{s_0}(\tau) \geq 0 \quad \forall\, i \in Y, t \in \bigcup_{j \in N_i} T_{i,j}, g \in G,$$

wherein $a_{i,t}^{s,c}(\tau)$ represents a number of locomotives of power class c cab signaling type s assigned to train t initiated at location i during a time interval (τ,τ+1), and wherein $U^c$ represents a power of one locomotive in power class c, and wherein $E^{c,g}$ represents a matrix showing equivalence of different power classes, and wherein $\alpha_{i,t}^{g}(\tau)$ is an indicator for marking that a train t at a location i is powered with locomotives from a power group g, and wherein $R_{i,t}^{s_0}(\tau)$ is power required at location i for train t using signaling category $s_0$ during a time interval (τ, τ+1), and wherein Y is a set of locations in the network, and wherein $T_{i,j}$ is a set of trains at location i planned to move to locations, and wherein g is an index for marking a locomotive group of power, and wherein G represents a set of groups of power, and wherein $N_i$ represents a set of locations adjacent to location i.

21. The method of claim 19 wherein the execution of step (h) is subject to the following constraints, $$\sum_{g \in G} \alpha_{i,t}^{g}(\tau) - \delta_{i,t}(\tau) + \delta_{i,t}(\tau - 1) = 0 \quad \forall\, i \in Y, t \in \bigcup_{j \in N_i} T_{i,j}$$

$$\delta_{i,t}(\tau) \leq 1 \quad \forall\, i \in Y, t \in \bigcup_{j \in N_i} T_{i,j}$$

$$\sum_{c \in C} E^{c,g} \sum_{s \in S} S_s^{s_0} a_{i,t}^{s,c}(\tau) - \alpha_{i,t}^{g}(\tau) \geq 0 \quad \forall\, i \in Y, t \in \bigcup_{j \in N_i} T_{i,j}, g \in G,$$

wherein $\alpha_{i,t}^{g}(\tau)$ is an indicator for marking that a train t at a location i is powered with locomotives from a power group g, and wherein $\delta_{i,t}(\tau)$ represents a logical variable associated with train t at location i during an interval (τ, τ+1), and wherein Y is a set of locations in the network, and wherein $T_{i,j}$ is a set of trains at location i planned to move to location j, and wherein g is an index for marking a locomotive group of power, and wherein $E^{c,g}$ represents a matrix showing equivalence of different power classes, and wherein $a_{i,t}^{s,c}(\tau)$ represents a number of locomotives of power class c cab signaling type s assigned to train t initiated at location i during a time interval (τ, τ+1), and wherein G represents a set of groups of power, and wherein $N_i$ represents a set of locations adjacent to location i.

22. The method of claim 19 wherein the execution of step (h) is subject to the following constraint, $$\sum_{s \in S} \sum_{c \in C} a_{i,t}^{s,c}(\tau) \leq M_{i,t} \quad \forall\, i \in Y, t \in \bigcup_{j \in N_i} T_{i,j},$$

and wherein $a_{i,t}^{s,c}(\tau)$ represents a number of locomotives of power class c cab signaling type s assigned to train t initiated at location i during a time interval (τ, τ+1), and wherein $M_{i,t}$ represents a maximum number of locomotives that can be attached to train t originating at location i, and wherein Y is a set of locations in the network, and wherein $T_{i,j}$ is a set of trains at location i planned to move to location j, and wherein $N_i$ represents a set of locations adjacent to location i.

23. The method of claim 19 wherein the execution of step (h) is subject to the following constraints, $$\sum_{j \in N_i} x_{j,i}^{s,c}(\tau - \Theta_{i,j} - \theta_{i,t}) - \sum_{j \in N_i} x_{i,j}^{s,c}(\tau) +$$

$$\sum_{k=0}^{\Pi_i^c(k)>0} \left( \sum_{j \in N_i} \sum_{t \in T_{j,i}} a_{j,t}^{s,c}(\tau - k - \Theta_{j,i} - \theta_{j,t}) \right) \prod_i^c (k) -$$

$$\sum_{t \in \bigcup_{j \in N_i} T_{i,j}} a_{i,t}^{s,c}(\tau) + N_i^{s,c}(\tau) - Q_i^{s,c}(\tau) - \sum_{t \in \bigcup_{j \in N_i} T_{i,j}} a_{i,t}^{s,c}(\tau) -$$

$$A_i^{s,c}(\tau) + A_i^{s,c}(\tau - 1) = \sum_{k=0}^{\Pi_i^c(k)>0} \left( \sum_{j \in N_i} \sum_{t \in T_{j,i}} B_{j,i}^{s,c}(\tau - k) \right) \prod_i^c (k)$$

$$\forall\, i \in Y, s \in S, c \in C,$$

and wherein $N_i$ represents a set of locations adjacent to location i, and wherein $x_{i,j}^{s,c}(\tau)$ represents a number of locomotives of signaling category s, power class c, planned to exit location i and directed to adjacent location j as extra power during the time interval (τ, τ+1), and wherein $\Theta_{i,j}$ represents a time for traveling from location i to adjacent locations, and wherein $\theta_{i,t}$ represents a time needed to complete the departure procedures at location i (travel from locomotive shop to departure yard, charging the brake system, inspection, brake testing, etc.), and wherein $\Pi_i^c(k;k+1)$ represents a probability that a locomotive of power class c will be released from maintenance at location i between k and k+1 hours, and wherein $a_{i,t}^{s,c}(\tau)$ represents a number of locomotives of power class c cab signaling type s assigned to train t initiated at location i during a time interval (τ, τ-1), and wherein $N_i^{s,c}(\tau)$ represents a number of locomotives of power class c and cab signaling s entering the fleet at location i during the time interval (τ, τ+1), and wherein $Q_i^{s,c}(\tau)$ represents a number of locomotives of power class c and cab signaling s exiting the fleet at location i during the time interval (τ, τ+1), and wherein $A_i^{s,c}(\tau)$ represents a number of locomotives of power class c and cab signaling s available at location i at the beginning of the time interval (τ,τ+1), and wherein $B_{i,j}^{s,c}(\tau)$ represents a number of locomotive of class c and signaling category s planned to arrive at location i from direction j during the time interval (τ, τ+1), and wherein Y is a set of locations in the network.

24. The method of claim 19 wherein the execution of step (h) is subject to the following constraint, $$\sum_{g \in G} \sum_{t \in T_{i,j}} \alpha_{i,j}^{g}(\tau) \leq K_{i,j} \quad \forall\, i \in Y, j \in N_i,$$

and wherein $\alpha_{i,t}^{g}(\tau)$ is an indicator for marking that a train t at a location i is powered with locomotives from a power group g, and wherein $K_{i,j}$ represents a capacity of the corridor between locations i and j, and wherein and wherein Y is a set of locations in the network, and wherein $N_i$ represents a set of locations adjacent to location i.

25. The method of claim 19 wherein the execution of step (h) is subject to the following constraints, $$\Lambda_i(\tau) + \sum_{g \in G} \left( \sum_{j \in N_i} \alpha_{j,t}^{g}(\tau - \Theta_{j,i} - \theta_{j,t}) - \sum_{t \in \bigcup_{j \in N_i} T_{i,j}} \alpha_{i,t}^{g}(\tau) \right) - \Lambda(\tau + 1) = 0$$

$$\Lambda_i(\tau) \leq L_i$$

and wherein $\Lambda_i(\tau)$ represents a number of trains at location i at the beginning of the time interval (τ, τ+1), and wherein $\alpha_{i,t}{}^g(\tau)$ is an indicator for marking that a train t at a location i is powered with locomotives from a power group g, and wherein $\Theta_{i,j}$ represents a time for traveling from location i to adjacent location j, and wherein $\theta_{i,t}$ represents a time needed to complete the departure procedures at location i (travel from locomotive shop to departure yard, charging the brake system, inspection, brake testing, etc.), and wherein $L_i$ represents the upper limit of yard capacity.

26. The method of claim 19 wherein the execution of step (h) is subject to the following constraint, $$\delta_{i,t}(\tau+1) - \delta_{i,t}(\tau) \geq 0 \quad \forall i \in Y, t \in \bigcup_{j \in N_i} T_{i,j},$$

and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j.

27. The method of claim 19 including the additional step (i) scheduling the movement of locomotives based on the result of step (h).

28. An apparatus for optimizing the assignment of locomotives in a railroad network by minimizing a penalty associated with late train departures, wherein the penalty incurred, $P_{i,t}(\tau)$, if a train t at a location i does not have power over the predetermined time period $\tau$ is known, said apparatus comprising:

means for determining whether a train t is powered during the predetermined time interval $\tau$;

means for assigning a first value to each train t if the train t does not have power and for assigning a second value to each train t if the train t does have power;

means for multiplying the output from said means for assigning by the penalty incurred;

means for summing output from said means for multiplying over all trains t moving between locations i and j, over all locations i, and over the predetermined time period $\tau$; and means for minimizing the output from said means for summing.

29. The apparatus of claim 28 wherein the means for minimizing is subject to the following constraint, $$\sum_{s \in S} \sum_{c \in C} a_{i,t}^{s,c}(\tau) U^c E^{c,g} - \alpha_{i,t}^g(\tau) R_{i,t}^{s_0}(\tau) \geq 0 \quad \forall i \in Y, t \in \bigcup_{j \in N_i} T_{i,j}, g \in G,$$

wherein $a_{i,t}{}^{s,c}(\tau)$ represents a number of locomotives of power class c cab signaling type s assigned to train t initiated at location i during a time interval $(\tau, \tau+1)$, and wherein $U^c$ represents a power of one locomotive in power class c, and wherein $E^{c,g}$ represents a matrix showing equivalence of different power classes, and wherein $\alpha_{i,t}{}^g(\tau)$ is an indicator for marking that a train t at a location i is powered with locomotives from a power group g, and wherein $R_{i,t}{}^{s_0}(\tau)$ is power required at location i for train t using signaling category $s_0$ during a time interval $(\tau, \tau+1)$, and wherein Y is a set of locations in the network, and wherein $T_{i,j}$ is a set of trains at location i planned to move to location j, and wherein g is an index for marking a locomotive group of power, and wherein G represents a set of groups of power, and wherein $N_i$ represents a set of locations adjacent to location i.

30. The apparatus of claim 28 wherein the means for minimizing is subject to the following constraints, $$\sum_{g \in G} \alpha_{i,t}^g(\tau) - \delta_{i,t}(\tau) + \delta_{i,t}(\tau-1) = 0 \quad \forall i \in Y, t \in \bigcup_{j \in N_i} T_{i,j}$$

$$\delta_{i,t}(\tau) \leq 1 \quad \forall i \in Y, t \in \bigcup_{j \in N_i} T_{i,j}$$

$$\sum_{c \in C} E^{c,g} \sum_{s \in S} S_s^{s_0} a_{i,t}^{s,c}(\tau) - \alpha_{i,t}^g(\tau) \geq 0 \quad \forall i \in Y, t \in \bigcup_{j \in N_i} T_{i,j}, g \in G,$$

and wherein $\alpha_{i,t}{}^g(\tau)$ is an indicator for marking that a train t at a location i is powered with locomotives from a power group g, and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j, and wherein g is an index for marking a locomotive group of power, and wherein $E^{c,g}$ represents a matrix showing equivalence of different power classes, and wherein $a_{i,t}{}^{s,c}(\tau)$ represents a number of locomotives of power class c cab signaling type s assigned to train t initiated at location i during a time interval $(\tau, \tau+1)$, and wherein G represents a set of groups of power, and wherein $N_i$ represents a set of locations adjacent to location i.

31. The apparatus of claim 28 wherein the means for minimizing is subject to the following constraint, $$\sum_{s \in S} \sum_{c \in C} a_{i,t}^{s,c}(\tau) \leq M_{i,t} \quad \forall i \in Y, t \in \bigcup_{j \in N_i} T_{i,j},$$

and wherein $a_{i,t}{}^{s,c}(\tau)$ represents a number of locomotives of power class c cab signaling type s assigned to train t initiated at location i during a time interval $(\tau, \tau+1)$, and wherein $M_{i,t}$ represents a maximum number of locomotives that can be attached to train t originating at location i, and wherein Y is a set of locations in the network, and wherein $T_{i,j}$ is a set of trains at location i planned to move to location j, and wherein $N_i$ represents a set of locations adjacent to location i.

32. The apparatus of claim 28 wherein the means for minimizing is subject to the following constraints, $$\sum_{j \in N_i} x_{j,i}^{s,c}(\tau - \Theta_{i,j} - \theta_{i,t}) - \sum_{j \in N_i} x_{i,j}^{s,c}(\tau) +$$

$$\sum_{k=0}^{\Pi_i^c(k)>0} \left( \sum_{j \in N_i} \sum_{t \in T_{j,i}} a_{j,i}^{s,c}(\tau - k - \Theta_{j,i} - \theta_{j,t}) \right) \prod_i^c(k) - \sum_{t \in \bigcup_{j \in N_i} T_{i,j}} a_{i,t}^{s,c}(\tau) +$$

$$N_i^{s,c}(\tau) - Q_i^{s,c}(\tau) - \sum_{t \in \bigcup_{j \in N_i} T_{i,j}} a_{i,t}^{s,c}(\tau) - A_i^{s,c}(\tau) + A_i^{s,c}(\tau - 1) =$$

$$\sum_{k=0}^{\Pi_i^c(k)>0} \left( \sum_{j \in N_i} \sum_{t \in T_{j,i}} B_{j,i}^{s,c}(\tau - k) \right) \prod_i^c(k)$$

$$\forall i \in Y, s \in S, c \in C,$$

and wherein $N_i$ represents a set of locations adjacent to location i, and wherein $x_{i,t}{}^{s,c}(\tau)$ represents a number of locomotives of signaling category s, power class c, planned to exit location i and directed to adjacent locations as extra power during the time interval $(\tau, \tau+1)$, and wherein $\Theta_{i,j}$ represents a time for traveling from location i to adjacent locations, and wherein $\theta_{i,t}$ represents a time needed to complete the departure procedures at location i (travel from locomotive shop to departure yard, charging the brake system, inspection, brake testing, etc.), and wherein $\Pi_i^c$ (k;k+1) represents a probability that a locomotive of power class c will be released from maintenance at location i between k and k+1 hours, and wherein $a_{i,t}^{s,c}(\tau)$ represents a number of locomotives of power class c cab signaling type s assigned to train t initiated at location i during a time interval $(\tau, \tau+1)$, and wherein $N_i^{s,c}(\tau)$ represents a number of locomotives of power class c and cab signaling s entering the fleet at location i during the time interval $(\tau, \tau+1)$, and wherein $Q_i^{s,c}(\tau)$ represents a number of locomotives of power class c and cab signaling s exiting the fleet at location i during the time interval $(\tau, \tau+1)$, and wherein $A_i^{s,c}(\tau)$ represents a number of locomotives of power class c and cab signaling s available at location i at the beginning of the time interval $(\tau, \tau-1)$ and wherein $B_{i,j}^{s,c}(\tau)$ represents a number of locomotive of class c and signaling category s planned to arrive at location i from direction j during the time interval $(\tau, \tau+1)$, and wherein Y is a set of locations in the network.

33. The apparatus of claim 28 wherein the means for minimizing is subject to the following constraint, $$\sum_{g \in G} \sum_{t \in T_{i,j}} \alpha_{i,j}^g(\tau) \leq K_{i,j} \quad \forall i \in Y, j \in N_i,$$

and wherein $\alpha_{i,t}^g(\tau)$ is an indicator for marking that a train t at a location i is powered with locomotives from a power group g, and wherein $K_{i,j}$ represents a capacity of the corridor between locations i and j, and wherein and wherein Y is a set of locations in the network, and wherein $N_i$ represents a set of locations adjacent to location i.

34. The apparatus of claim 28 wherein the means for minimizing is subject to the following constraints, $$\Lambda_i(\tau) + \sum_{g \in G} \left( \sum_{j \in N_i} \alpha_{j,t}^g(\tau - \Theta_{j,i} - \theta_{j,t}) - \sum_{t \in \bigcup_{j \in N_i} T_{i,j}} \alpha_{i,t}^g(\tau) \right) - \Lambda(\tau+1) = 0$$

$$\Lambda_i(\tau) \leq L_t$$

and wherein $\Lambda_i(\tau)$ represents a number of trains at location i at the beginning of the time interval $(\tau, \tau+1)$, and wherein $\alpha_{i,t}^g(\tau)$ is an indicator for marking that a train t at a location i is powered with locomotives from a power group g, and wherein $\Theta_{i,j}$ represents a time for traveling from location i to adjacent location j, and wherein $\theta_{i,t}$ represents a time needed to complete the departure procedures at location i (travel from locomotive shop to departure yard, charging the brake system, inspection, brake testing, etc.), and wherein $L_i$ represents the upper limit of yard capacity.

35. The apparatus of claim 28 wherein the means for minimizing is subject to the following constraint, $$\delta_{i,t}(\tau+1) - \delta_{i,t}(\tau) \geq 0 \quad \forall i \in Y, t \in \bigcup_{j \in N_i} T_{i,j},$$

and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j.

36. The apparatus of claim 28 including means for scheduling the movement of the locomotives based on the output from the means for minimizing.

37. The apparatus of claim 28 including means for controlling movement of the locomotives in accord with the output from the means for minimizing.

38. An apparatus for optimizing the assignment of locomotives in a railroad network by minimizing a cost of operating trains using a power class c, wherein the cost of using a locomotive of power class c as active power is known and wherein the traveling distance of each train departing from location i is known, said apparatus comprising:

means for determining the number of locomotives of power class c and signaling class s assigned to a train t initiated at location i over the predetermined time $\tau$;

means for calculating the product of the number of locomotives, the cost of using a locomotive of power class c as active power in a train t and the distance train t will travel;

means for summing the product over all power classes, over all signaling classes, over all trains traveling between locations i and j, over all locations i on the network, and over the predetermined time $\tau$; and means for minimizing the sum.

39. The apparatus of claim 38 wherein the means for minimizing is subject to the following constraint, $$\sum_{s \in S} \sum_{c \in C} a_{i,t}^{s,c}(\tau) U^c E^{c,g} - \alpha_{i,t}^g(\tau) R_{i,t}^{s_0}(\tau) \geq 0 \quad \forall i \in Y, t \in \bigcup_{j \in N_i} T_{i,j}, g \in G,$$

wherein $a_{i,t}^{s,c}(\tau)$ represents a number of locomotives of power class c cab signaling type s assigned to train t initiated at location i during a time interval $(\tau, \tau+1)$, and wherein $U^c$ represents a power of one locomotive in power class c, and wherein $E^{c,g}$ represents a matrix showing equivalence of different power classes, and wherein $\alpha_{i,t}^g(\tau)$ is an indicator for marking that a train t at a location i is powered with locomotives from a power group g, and wherein $R_{i,t}^{s_0}(\tau)$ is power required at location i for train t using signaling category $s_0$ during a time interval $(\tau, \tau+1)$, and wherein Y is a set of locations in the network, and wherein $T_{i,j}$ is a set of trains at location i planned to move to location j, and wherein g is an index for marking a locomotive group of power, and wherein G represents a set of groups of power, and wherein $N_i$ represents a set of locations adjacent to location i.

40. The apparatus of claim 38 wherein the means for minimizing is subject to the following constraints, $$\sum_{g \in G} \alpha_{i,t}^g(\tau) - \delta_{i,t}(\tau) + \delta_{i,t}(\tau-1) = 0 \quad \forall i \in Y, t \in \bigcup_{j \in N_i} T_{i,j}$$

$$\delta_{i,t}(\tau) \leq 1 \quad \forall i \in Y, t \in \bigcup_{j \in N_i} T_{i,j}$$

$$\sum_{c \in C} E^{c,g} \sum_{s \in S} S_s^{s_0} a_{i,t}^{s,c}(\tau) - \alpha_{i,t}^g(\tau) \geq 0 \quad \forall i \in Y, t \in \bigcup_{j \in N_i} T_{i,j}, g \in G,$$

and wherein $\alpha_{i,t}^g(\tau)$ is an indicator for marking that a train t at a location i is powered with locomotives from a power group g, and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j, and wherein g is an index for marking a locomotive group of power, and wherein $E^{c,g}$ represents a matrix showing equivalence of different power classes, and wherein as $a_{i,t}^{s,c}(\tau)$ represents a number of locomotives of power class c cab signaling type s assigned to train t initiated at location i during a time interval $(\tau, \tau+1)$, and wherein G represents a set of groups of power, and wherein $N_i$ represents a set of locations adjacent to location i.

41. The apparatus of claim 38 wherein the means for minimizing is subject to the following constraint, $$\sum_{s \in S} \sum_{c \in C} a_{i,t}^{s,c}(\tau) \leq M_{i,t} \quad \forall\, i \in Y, t \in \bigcup_{j \in N_i} T_{i,j},$$

and wherein $a_{i,t}^{s,c}(\tau)$ represents a number of locomotives of power class c cab signaling type s assigned to train t initiated at location i during a time interval $(\tau, \tau+1)$, and wherein $M_{i,t}$ represents a maximum number of locomotives that can be attached to train t originating at location i, and wherein Y is a set of locations in the network, and wherein $T_{i,j}$ is a set of trains at location i planned to move to location j, and wherein $N_i$ represents a set of locations adjacent to location i.

42. The apparatus of claim 38 wherein the means for minimizing is subject to the following constraints, $$\sum_{j \in N_i} x_{j,i}^{s,c}(\tau - \Theta_{i,j} - \theta_{j,t}) - \sum_{j \in N_i} x_{i,j}^{s,c}(\tau) +$$

$$\sum_{k=0}^{\Pi_i^c(k)>0} \left( \sum_{j \in N_i} \sum_{t \in T_{j,i}} a_{j,t}^{s,c}(\tau - k - \Theta_{j,i} - \theta_{j,t}) \right) \prod_i^c (k) - \sum_{t \in \bigcup_{j \in N_i} T_{i,j}} a_{i,t}^{s,c}(\tau) +$$

$$N_i^{s,c}(\tau) - Q_i^{s,c}(\tau) - \sum_{t \in \bigcup_{j \in N_i} T_{i,j}} a_{i,t}^{s,c}(\tau) - A_i^{s,c}(\tau) + A_i^{s,c}(\tau - 1) =$$

$$\sum_{k=0}^{\Pi_i^c(k)>0} \left( \sum_{j \in N_i} \sum_{t \in T_{j,i}} B_{j,i}^{s,c}(\tau - k) \right) \prod_i^c (k)$$

$$\forall\, i \in Y, s \in S, c \in C,$$

and wherein $N_i$ represents a set of locations adjacent to location i, and wherein $x_{i,j}^{s,c}(\tau)$ represents a number of locomotives of signaling category s, power class c, planned to exit location i and directed to adjacent location j as extra power during the time interval $(\tau, \tau+1)$, and wherein $\Theta_{i,j}$ represents a time for traveling from location i to adjacent location i, and wherein $\theta_{i,t}$ represents a time needed to complete the departure procedures at location i (travel from locomotive shop to departure yard, charging the brake system, inspection, brake testing, etc.), and wherein $\Pi_i^c(k;k+1)$ represents a probability that a locomotive of power class c will be released from maintenance at location i between k and k+1 hours, and wherein $a_{i,t}^{s,c}(\tau)$ represents a number of locomotives of power class c cab signaling type s assigned to train i initiated at location i during a time interval $(\tau, \tau+1)$, and wherein $N_i^{s,c}(\tau)$ represents a number of locomotives of power class c and cab signaling s entering the fleet at location i during the time interval $(\tau, \tau+1)$, and wherein $Q_i^{s,c}(\tau)$ represents a number of locomotives of power class c and cab signaling s exiting the fleet at location i during the time interval $(\tau, \tau+1)$, and wherein $A_i^{s,c}(\tau)$ represents a number of locomotives of power class c and cab signaling s available at location i at the beginning of the time interval $(\tau, \tau+1)$, and wherein $B_{i,j}^{s,c}(\tau)$ represents a number of locomotive of class c and signaling category s planned to arrive at location i from direction j during the time interval $(\tau, \tau+1)$, and wherein Y is a set of locations in the network.

43. The apparatus of claim 38 wherein the means for minimizing is subject to the following constraint, $$\sum_{g \in G} \sum_{t \in T_{i,j}} \alpha_{i,j}^g(\tau) \leq K_{i,j} \quad \forall\, i \in Y, j \in N_i,$$

and wherein $\alpha_{i,t}^g(\tau)$ is an indicator for marking that a train t at a location i is powered with locomotives from a power group g, and wherein $K_{i,j}$ represents a capacity of the corridor between locations i and j, and wherein and wherein Y is a set of locations in the network, and wherein $N_i$ represents a set of locations adjacent to location i.

44. The apparatus of claim 38 wherein the means for minimizing is subject to the following constraints, $$\Lambda_i(\tau) + \sum_{g \in G} \left( \sum_{j \in N_i} \alpha_{j,t}^g(\tau - \Theta_{j,i} - \theta_{j,t}) - \sum_{t \in \bigcup_{j \in N_i} T_{i,j}} \alpha_{i,t}^g(\tau) \right) - \Lambda(\tau+1) = 0$$

$$\Lambda_i(\tau) \leq L_i$$

and wherein $\Lambda_i(\tau)$ represents a number of trains at location i at the beginning of the time interval $(\tau, \tau+1)$, and wherein $\alpha_{i,t}^g(\tau)$ is an indicator for marking that a train t at a location i is powered with locomotives from a power group g, and wherein $\Theta_{i,j}$ represents a time for traveling from location i to adjacent location j, and wherein $\theta_{i,t}$ represents a time needed to complete the departure procedures at location i (travel from locomotive shop to departure yard, charging the brake system, inspection, brake testing, etc.), and wherein $L_i$ represents the upper limit of yard capacity.

45. The apparatus of claim 38 wherein the means for minimizing is subject to the following constraint, $$\delta_{i,t}(\tau+1) - \delta_{i,t}(\tau) \geq 0 \quad \forall\, i \in Y, t \in \bigcup_{j \in N_i} T_{i,j},$$

and wherein $\delta_{i,t}(\tau)$ represents a logical variable associated with train t at location i during an interval $(\tau, \tau+1)$, and wherein Y is a set of locations in the network, and wherein $T_{i,j}$ is a set of trains at location i planned to move to location j.

46. The apparatus of claim 38 including means for scheduling the movement of locomotives based on the output from the means for minimizing.

47. The apparatus of claim 38 including means for controlling the movement of locomotives based on the output from the means for minimizing.

48. A computer program for optimizing the assignment of locomotives in a railroad network by minimizing a cost of operating trains using a power class c, wherein the cost of using a locomotive of power class c as active power is known and wherein the traveling distance of each train departing from location i is known, said computer program comprising the steps of:

(a) determining the number of locomotives of power class c and signaling class s assigned to a train t initiated at location i over the predetermined time $\tau$;

(b) calculating the product of the result of step (a), the cost of using a locomotive of power class c as active power in a train t and the distance train t will travel;

(c) summing the result of step (b) over all power classes;

(d) summing the result of step (c) over all signaling classes;

(e) summing the result of step (d) over all trains traveling between locations i and j;

(f) summing the result of step (e) over all locations i on the network;

(g) summing the result of step (f) over the predetermined time $\tau$; and (h) minimizing the result of step (g).

* * * * *